United States Patent
Kobayashi

(10) Patent No.: US 11,275,799 B2
(45) Date of Patent: Mar. 15, 2022

(54) INFORMATION PROCESSING DEVICE AND NON-TRANSITORY COMPUTER READABLE MEDIUM

(71) Applicant: FUJIFILM BUSINESS INNOVATION CORP., Tokyo (JP)

(72) Inventor: Saneyuki Kobayashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 73 days.

(21) Appl. No.: 16/516,951

(22) Filed: Jul. 19, 2019

(65) Prior Publication Data

US 2020/0301981 A1 Sep. 24, 2020

(30) Foreign Application Priority Data

Mar. 18, 2019 (JP) .............................. JP2019-049750

(51) Int. Cl.
*G06F 16/951* (2019.01)
(52) U.S. Cl.
CPC .................................. *G06F 16/951* (2019.01)
(58) Field of Classification Search
CPC ....................................................... G06F 16/951
USPC .......................................................... 707/709
See application file for complete search history.

(56) References Cited

U.S. PATENT DOCUMENTS

| 2003/0220922 A1* | 11/2003 | Yamamoto | G06F 16/35 |
| 2011/0219000 A1* | 9/2011 | Kusumura | G06F 16/3346 707/737 |
| 2012/0323564 A1* | 12/2012 | Fujii | H04N 9/8233 704/9 |

FOREIGN PATENT DOCUMENTS

| JP | 2010257412 | * 4/2009 | ............. G06F 16/30 |
| JP | 2010-257412 A | 11/2010 | |

* cited by examiner

*Primary Examiner* — Kuen S Lu
(74) *Attorney, Agent, or Firm* — Oliff PLC

(57) ABSTRACT

An information processing device includes an acquisition unit, a division unit, and a determination unit. The acquisition unit is configured to acquire content for which index data is to be created. The division unit is configured to divide the content into predetermined blocks. The determination unit is configured to refer to unnecessary term information and determine a region in each block that is not allowed to be referred to when the index data of the content is created. In the unnecessary term information, an unnecessary term is specified among terms included in the content. The unnecessary term is a term that is not allowed to be registered in the index data.

9 Claims, 5 Drawing Sheets

FIG. 3

1. Introduction
Thank you for purchasing MW this time. This document describes operation of an MW Web client on a client computer after installing MW.

2. Positioning OF Web Client
The Web client accesses the MW server via the network from the client PC browser.
The Web client can create documents and edit documents with others.

3. User Who Can Use Web Client
The users who can use the Web client are MW users registered in the server.

[Reference]
・User Registration → "Setup Guide" (P. 86)

FIG. 4

| UNNECESSARY | TERM | SPECIFY REGULAR EXPRESSION |
|---|---|---|
| ■ | THIS DOCUMENT | |
| ☐ | WEB CLIENT | |
| ☐ | EDIT | |
| ☐ | TOGETHER | |
| ■ | (P. 86) | (P. [+-]?¥d+) |

FIG. 5

| BLOCK | THE NUMBER OF UNNECESSARY TERMS |
|---|---|
| 1. Introduction | 5 |
| 2. Web Client ... | 1 |
| 3. User Who ... | 3 |

FIG. 6

| | 5≤THE NUMBER OF UNNECESSARY TERMS | 3≤THE NUMBER OF UNNECESSARY TERMS<5 | THE NUMBER OF UNNECESSARY TERMS<3 |
|---|---|---|---|
| DELETION REGION | DELETE BLOCK | DELETE PART INCLUDING UNNECESSARY TERMS | NO PROCESS |

FIG. 7

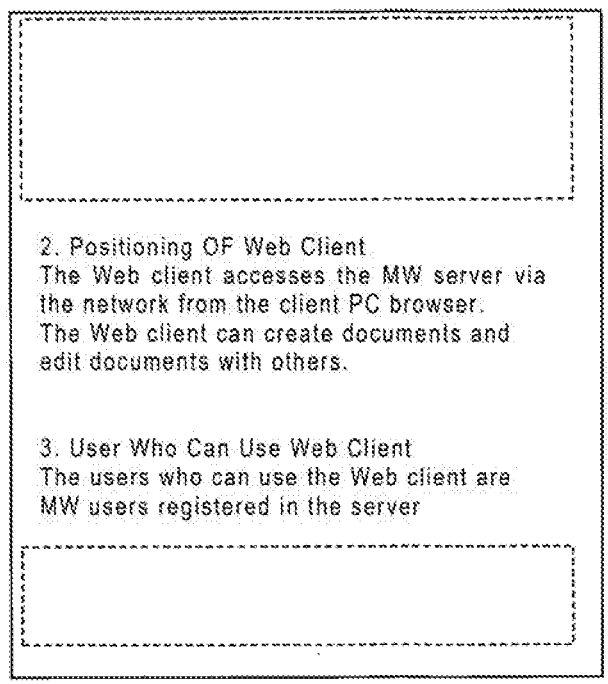

2. Positioning OF Web Client
The Web client accesses the MW server via the network from the client PC browser.
The Web client can create documents and edit documents with others.

3. User Who Can Use Web Client
The users who can use the Web client are MW users registered in the server

FIG. 8

| UNNECESSARY | TERM | SPECIFY REGULAR EXPRESSION | WEIGHT COEFFICIENT |
|---|---|---|---|
| ☑ | THIS DOCUMENT | | 5 |
| ☐ | WEB CLIENT | | |
| ☐ | EDIT | | |
| ☐ | TOGETHER | | |
| ☑ | (P. 86) | (P. [+-]?¥d+) | 10 |

*FIG. 9*

| BLOCK | UNNECESSARY TERM DEGREE |
|---|---|
| 1. Introduction | 55 |
| 2. Web Client ... | 15 |
| 3. User Who ... | 32 |

*FIG. 10*

| | 50 ≤ UNNECESSARY TERM DEGREE | 30 ≤ UNNECESSARY TERM DEGREE < 55 | UNNECESSARY TERM DEGREE < 30 |
|---|---|---|---|
| DELETION REGION | DELETE BLOCK | DELETE PART INCLUDING UNNECESSARY TERMS | NO PROCESS |

INFORMATION PROCESSING DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-049750 filed Mar. 18, 2019.

BACKGROUND

1. Technical Field

The present disclosure relates to an information processing device and a non-transitory computer readable medium.

2. Related Art

For a database search, an index may be created in advance by extracting keywords representing features of documents from the documents by indexing. A crawler can shorten search time by searching the index when crawling documents.

As the documents described above, content described in HyperText Markup Language (HTML) are present on a web server. A technology has been proposed to partially process the content by analyzing the content (for example, JP-A-2010-257412).

SUMMARY

However, when index data (that is, the "index" described above) is created with reference to the entire content, information such as a term that does not represent a feature of the content may be extracted from the content and included in the index data.

Aspects of non-limiting embodiments of the present disclosure relate to limiting a scope of content that is referred to when index data is created.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing device including: an acquisition unit configured to acquire content for which index data is to be created; a division unit configured to divide the content into predetermined blocks; and a determination unit configured to refer to unnecessary term information and determine a region in each block that is not allowed to be referred to when the index data of the content is created, in which in the unnecessary term information, an unnecessary term is specified among terms included in the content, and the unnecessary term is a term that is not allowed to be registered in the index data.

BRIEF DESCRIPTION OF THE DRAWINGS

Exemplary embodiment(s) of the present disclosure will be described in detail based on the following figures, wherein:

FIG. 3 shows an example of content to be processed according to the first exemplary embodiment;

FIG. 4 shows an example of a screen that is displayed when a user is allowed to specify unnecessary terms in the first exemplary embodiment;

FIG. 5 shows an example in which the unnecessary terms are aggregated for each block in the first exemplary embodiment;

FIG. 6 is a table diagram showing information which is referred to when determining a content deletion region according to the first exemplary embodiment;

FIG. 7 shows content obtained by changing the content shown in FIG. 3 according to the first exemplary embodiment;

FIG. 8 shows an example of a screen that is displayed when a user is allowed to specify unnecessary terms in a second exemplary embodiment;

FIG. 9 shows an example in which unnecessary terms are aggregated for each block in the second exemplary embodiment; and FIG. 10 is a table diagram showing information which is referred to when determining a content deletion region in the second exemplary embodiment.

DETAILED DESCRIPTION

Hereinafter, exemplary embodiments of the present disclosure will be described based on the drawings.

First Exemplary Embodiment

Figure 1:
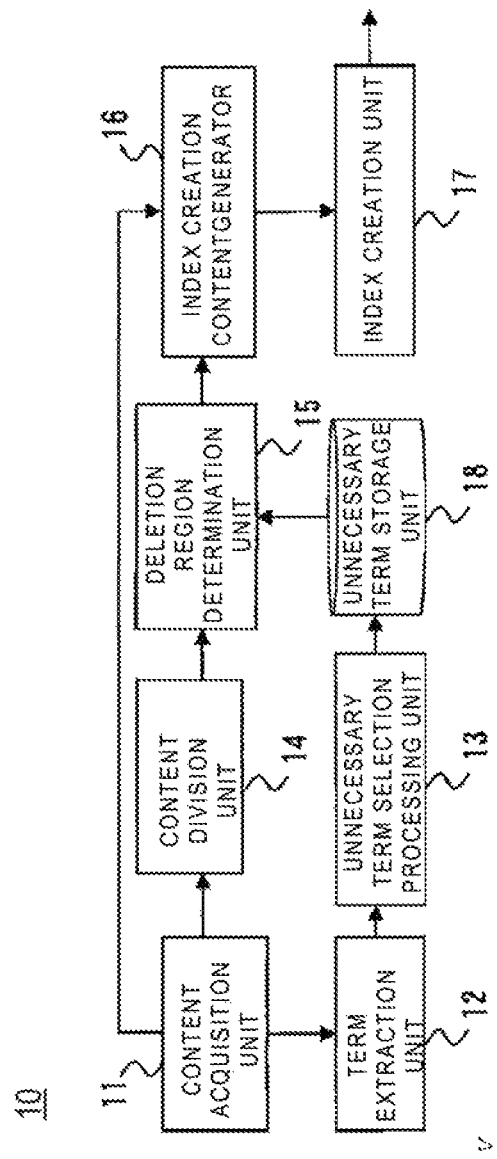
FIG. 1 is a block configuration diagram showing an information processing device according to an exemplary embodiment of the present disclosure.

FIG. 1 is a block configuration diagram showing an information processing device according to an exemplary embodiment of the present disclosure. An information processing device 10 according to the present exemplary embodiment may be implemented by a computer such as a general-purpose personal computer (PC). That is, the information processing device 10 includes a CPU, and a storage unit such as a ROM, a RAM, and a hard disk drive (HDD). When acquiring content to be processed via a network, the information processing device 10 includes a network interface. When reading content from a computer readable recording medium such as a CD-ROM or a USB memory, the information processing device 10 needs to have an external interface for that purpose. In addition, since the information processing device 10 needs to exchange information with a user, the information processing device 10 includes a user interface, for example, a mouse or a keyboard as an input unit, and a display as a display unit. Alternatively, when exchanging information with a user via a network, the information processing device 10 may have a network interface.

As shown in FIG. 1, the information processing device 10 in the present exemplary embodiment includes a content acquisition unit 11, a term extraction unit 12, an unnecessary term selection processing unit 13, a content division unit 14, a deletion region determination unit 15, an index creation content generator 16, an index creation unit 17, and an unnecessary term storage unit 18. Elements not used in the description of the present exemplary embodiment are omitted in the drawings. The content acquisition unit 11 acquires content that is a target for which an index is to be created. The term extraction unit 12 extracts terms from the acquired content. The unnecessary term selection processing unit 13 selects an unnecessary term from the extracted terms and stores the selected term in the unnecessary term storage unit 18. A term representing a feature of the content is extracted and included in the index. However, the "unnecessary term" refers to a term that is unnecessary as a term included in the index, that is, a term that is not desired to be included in the index. Therefore, the "unnecessary term" refers to a term that is not allowed to be registered in the index. The content division unit 14 divides the acquired content into predetermined blocks. The deletion region determination unit 15 refers to unnecessary term information stored in the unnecessary term storage unit 18 and determines a region that is not referred to when index data of the content is created in each block. The index creation content generator 16 generates content for index creation by deleting a deletion region determined by the deletion region determination unit 15 from the acquired content. When creating an index of the acquired content, the index creation unit 17 creates an index using the generated content for index creation as a target to be processed.

Here, the term "index" refers to index data that is used for speeding up a search for the content. The index is created corresponding to each content. A document is one of forms of the content. There is full-text search as a method of searching a document. When searching an object document by the full-text search, character strings such as terms included in the entire content of the document are searched. However, when a large number of documents are stored in a database storing the documents, search time may be long if all content of the documents is searched. Then, terms representing features of each document is extracted from the each document by indexing and are stored in advance. The index stores the extracted terms. The index is created in advance for index type full-text search. Then, a crawler can shorten the search time by setting the index as a search target when crawling the document in the index type full-text search.

Each of the elements 11 to 17 in the information processing device 10 are implemented by a computer and a program operating in a cooperative manner. The computer constitutes the information processing device 10. The program runs on the CPU mounted on the computer. In addition, the unnecessary term storage unit 18 is implemented by the HDD mounted on the information processing device 10. Alternatively, the RAM or an external storage unit may be used via the network.

In addition, the program used in the present exemplary embodiment may be provided by a communication unit or may be stored in a computer-readable recording medium such as a CD-ROM or a USB memory. The program provided by the communication unit or provided from the recording medium is installed in a computer, and the CPU of the computer sequentially executes the program to implement various processes.

Figure 2:
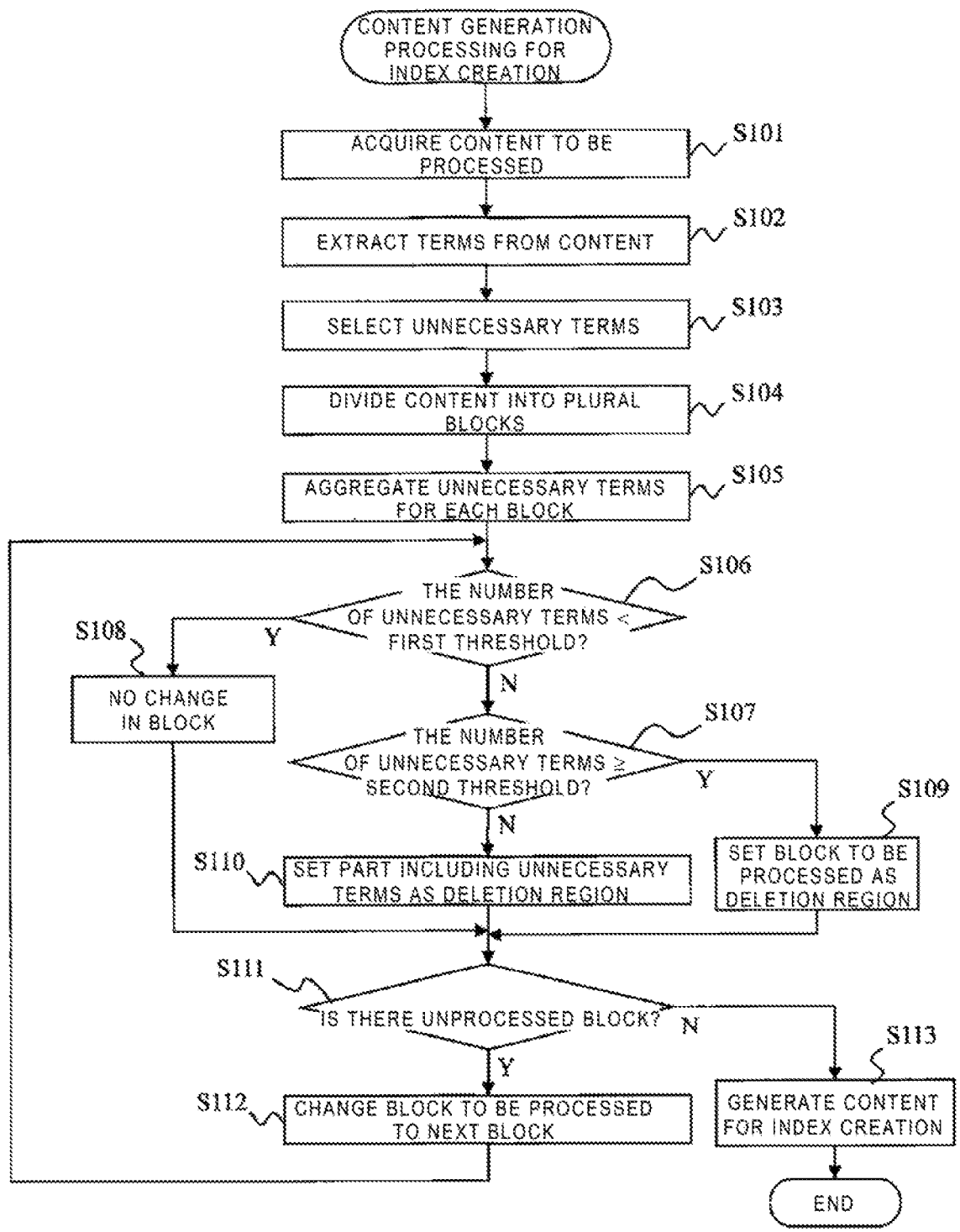
FIG. 2 is a flowchart showing a process for generating content for index creation according to a first exemplary embodiment.

A characteristic feature of the present exemplary embodiment is as follows. That is, when creating an index of content for which the index is to be created, the present exemplary embodiment determines a region that is not referred to according to positions of unnecessary terms and the number of unnecessary terms instead of using the entire content as a reference region, and does not allow the determined region to be referred to. For this reason, the acquired content is not used as it is as content for which an index is to be created, but content for index creation is separately generated. A process of generating the content for index creation will be described below with reference to the flowchart shown in FIG. 2.

The content acquisition unit 11 acquires content for which an index is to be created and which is specified by a user (step 101). FIG. 3 shows a description example of the acquired content. As shown in FIG. 3, content which is to be processed in the present exemplary embodiment is a document that is described so that the document can be divided into plural blocks, for examples, the document is chaptered. As described above, in the present exemplary embodiment, the content is not limited to content described in HTML. The content is only required to contain character strings and to be created by a document creation application, a spreadsheet application, a presentation application, or the like.

Subsequently, the term extraction unit 12 extracts terms from the acquired content (step 102). All terms included in the content may be extracted. However, the term extraction unit 12 in the present exemplary embodiment extracts terms that appears in the content at high frequencies. In the present exemplary embodiment, a threshold value that allows a presumption that an appearance frequency is high is set in advance. The term extraction unit 12 integrates the number of times each term appears in the entire content, and extracts terms each having an integrated value equal to or more than the threshold as candidates for an unnecessary term.

When the term extraction unit 12 extracts the terms, the unnecessary term selection processing unit 13 selects unnecessary terms from the extracted terms (step 103). In the present exemplary embodiment, the unnecessary terms are selected as follows.

FIG. 4 shows a table displayed on a screen of a terminal device (not shown) used by the user or the information processing device 10. In this table, columns for setting items of "unnecessary" and "specify regular expression" are provided corresponding to the terms extracted by the term extraction unit 12. The "unnecessary" column is provided with check boxes that allow the user to select unnecessary terms. The "specify regular expression" column is a column for the user to specify a common description form (that is, a regular expression) when the term extracted by the term extraction unit 12 is described in the common description form to other terms. FIG. 4 shows an example in which a regular expression is specified. In this example, the regular expression indicates a page number. For example, when a page number is described in a footer or the like of the content, the user inputs and specifies a regular expression for the page number. A term that matches the regular expression specified by the user is also regarded as an unnecessary term. Therefore, page numbers other than "(p. 86)" are also unnecessary terms.

The unnecessary term selection processing unit 13 may display a list of the terms extracted by the term extraction unit 12 in an order of appearance in the content. Alternatively, the unnecessary term selection processing unit 13 may sort the extracted terms in descending order of the appearance frequency and display a list of the extracted terms. Further, the user checks check boxes of terms that he/she wants to regard as unnecessary terms from the presented terms, like terms of "the document" and "(p. 86)" shown in FIG. 4.

As described above, the unnecessary term selection processing unit 13 in the present exemplary embodiment displays the list of the terms extracted by the term extraction unit 12, and selects the terms selected by the user from the listed terms as unnecessary terms. Further, the unnecessary term selection processing unit 13 generates unnecessary term information including the selected unnecessary terms and stores the unnecessary term information in the unnecessary term storage unit 18.

In addition, when the content acquisition unit 11 acquires the content, the content division unit 14 divides the acquired content into predetermined blocks (step 104). In the present exemplary embodiment, since the content is chaptered, the content is divided into blocks in units of chapters. The dividing method is not limited to dividing content in units of chapters. The content division unit 14 may divide content into predetermined blocks in units of sections, items, paragraphs, column breaks when the content is described in a column format, pages, and slides in accordance with a content type (for example, a contract, a specification, and a paper) or a display form.

Subsequently, the deletion region determination unit 15 refers to the unnecessary term information stored in the unnecessary term storage unit 18, and determines, for each divided block, a region which is not allowed to be referred to when the content index is created. It is simply required to complete selecting the unnecessary terms (steps 102, 103) and dividing the content into the blocks (step 104) before the deletion region determination unit 15 starts execution of the process. Therefore, the content may be divided into the blocks before the unnecessary terms are selected, or the content may be divided into the blocks concurrently with selecting the unnecessary terms.

First, the deletion region determination unit 15 integrates the appearance frequency of each unnecessary term included in the content and aggregates the appearance frequencies of the unnecessary terms for each block (step 105). The aggregate result is shown in FIG. 5. At this time, the deletion region determination unit 15 knows a description position of each unnecessary term in each block. Subsequently, the deletion region determination unit 15 repeatedly executes the following process for all blocks on a block by block basis.

FIG. 6 shows a table that is referred to when determining a region to be deleted from the content. According to a setting example shown in FIG. 6, "3" is set as a first threshold value, and "5" is set as a second threshold value.

First, the number of unnecessary terms included in a block to be processed is picked up from the table shown in FIG. 5. When the picked up number of unnecessary terms is smaller than the first threshold (Y in step 106), it is determined that there is no need to change anything in the block because there are not so many unnecessary terms described in the block (step 108).

In addition, when the number of unnecessary terms in the block is equal to or larger than the second threshold (Y in step 107), the entire block is set as a deletion target because the block includes many unnecessary terms (step 109). In other words, the entire block included in the content is set as the deletion region. On the other hand, when neither of the step 106 nor the step 107 is satisfied, that is, when the number of unnecessary terms in the block is equal to or larger than the first threshold value and less than the second threshold (N in step 106 and N in step 107), it is determined that there are not so many unnecessary terms described in the entire block while the unnecessary terms are described in the block to some extent, and a part of the block that includes the unnecessary terms is set as a deletion target (step 110). The "part of the block including the unnecessary terms" may be a sentence including the unnecessary terms, a paragraph including the unnecessary terms, or a section including the unnecessary terms. That is, the content is partially selected and set as a deletion region.

The number of terms included in a block varies depending on a size of the block. When the block is relatively narrow, an appearance frequency of an unnecessary term is relatively low, and when the block is relatively broad, the appearance frequency of the unnecessary term is relatively high. Therefore, a user such as an index creator needs to appropriately set the first threshold value and the second threshold value described above in accordance with a division unit of the block.

When there is a block for which the above-described process has not yet performed (Y in step 111), the block is set as a block to be processed (step 112), and the above process is executed. Then, when the process has been executed for all the blocks (N in step 111), the index creation content generator 16 deletes the deletion regions determined by the deletion region determination unit 15 in the acquired content, thereby generating content for index creation (step 113). As described above, in the present exemplary embodiment, the region to be referred to when the index is created can be changed from the entire content.

FIG. 7 shows an example of the content generated by the process for generating content for index creation described above. In the present exemplary embodiment, content is divided into blocks in units of chapters. According to the numerical example shown in FIGS. 5 and 6, the number of unnecessary terms included in the block of the first chapter "1. Introduction" is 5 which is equal to or more than the second threshold (=5). Therefore, the entire first chapter is deleted. The number of unnecessary terms included in the block of the second chapter "2. Positioning of Web Client" is 1 which is less than the first threshold (=3). Therefore, the entire second chapter is left as it is. The number of unnecessary terms included in the block of the third chapter "3. Users Who Can Use Web Client" is 3 which is equal to or more than the first threshold and less than the second threshold. Therefore, only a part of the third chapter including the unnecessary term is deleted.

When creating an index for the acquired content, the index creation unit 17 creates the index by referring to the content in which the description is changed by deleting the deletion regions by the index creation content generator 16, that is, the content for index creation.

Generally, a term having a high appearance frequency is considered to be an important term for content because the appearance frequency of the term is high, and the term is registered in an index. However, it is also considered that the term having the high appearance frequency, that is, a term frequently used is a general term and does not represent a feature of the content. For example, "the document" shown in FIG. 4 is not a feature term for the content. In addition, it can be assumed that the term "the Internet" would frequently appear in a document related to a network, and it is considered that the term "the Internet" is not a term representing a feature of content. The present exemplary embodiment focuses on such a point. That is, it is presumed that a term having a high appearance frequency is a general term but does not represent a feature of content. In the present exemplary embodiment, such a term having a high appearance frequency is not allowed to be registered in an index. In the above description, terms are displayed in a list form in descending order of the appearance frequency, and the user is allowed to select an unnecessary term from the terms in the list. Alternatively, for example, a term having an appearance frequency equal to or more than a predetermined threshold may be automatically extracted as an unnecessary term.

Second Exemplary Embodiment

In the first exemplary embodiment, a term having a high appearance frequency is set as an unnecessary term and is not included in an index. In other words, a term having a low appearance frequency may be regarded as a term representing a feature and included in an index. In this case, for example, a term that does not represent a feature of content, for example, a term appearing only once such as "Greetings" may be registered in an index.

Then, in the present exemplary embodiment, weights can be set for the terms extracted by the term extraction unit 12. Thereby, a term not representing a feature of content is not registered as an unnecessary term in the index.

The configuration of each of the hardware and functional blocks of the information processing device 10 according to the present exemplary embodiment may be the same as that in the first exemplary embodiment. In addition, the flowchart of the content generation process for index creation executed in the present exemplary embodiment may also be the same as that in the first exemplary embodiment. However, the process of determining the deletion region in the block is slightly different. Hereinafter, the process for generating content for index creation according to the present exemplary embodiment will be described below with reference to FIG. 2 in a similar manner to the first exemplary embodiment. A description of the same process as that of the first exemplary embodiment will be omitted as appropriate.

When the content acquisition unit 11 acquires content (step 101), the term extraction unit 12 extracts all terms included in the acquired content (step 102). The reason for extracting all terms is that it is desired to extract terms such as "Greetings" as exemplified above.

When the term extraction unit 12 extracts the terms, the unnecessary term selection processing unit 13 selects unnecessary terms from the extracted terms (step 103). In the present exemplary embodiment, the unnecessary terms are selected as follows.

FIG. 8 shows a table displayed on a screen of a terminal device (not shown) used by a user or the information processing device 10. In this table, as in the first exemplary embodiment, items of "unnecessary", "term", and "specify regular expression" are displayed in groups. Furthermore, in the present exemplary embodiment, an item column is provided that allows the user to specify a weight coefficient for each term. The user sets a weight coefficient for a term that is considered as an unnecessary term among the terms displayed in the list. As will be apparent from the following description, the higher certainty a selected term has that the selected term is an unnecessary term, the larger number the user sets to the selected term as a weight coefficient.

Then, when the content division unit 14 divides the acquired content into predetermined blocks (step 104), the deletion region determination unit 15 aggregates unnecessary terms included in the content for each block in the first exemplary embodiment (step 105). However, in the present exemplary embodiment, the deletion region determination unit 15 calculates an unnecessary term degree using the weight coefficient in addition to the number of unnecessary terms. The calculation result is shown in FIG. 9.

The term "unnecessary term degree" is an index value. The more a term is desired to be set as an unnecessary term, the higher value this index value indicates for the term. The unnecessary term degree is, for example, a value obtained by adding up, for each block, calculated values each obtained by multiplying the number of unnecessary terms included in the each block by the weight coefficient of the unnecessary term in the each block. As can be seen from this calculation formula, a positive integer of an appearance frequency is multiplied by the weight coefficient which is a positive integer. Accordingly, the larger the value of the weight coefficient is, the relatively larger the value of the unnecessary term degree is. In the present exemplary embodiment, since the user sets the weight coefficients, the unnecessary term degrees may also be regarded as index values indicating to what extent the user wants not to include the unnecessary terms in an index. Then, unnecessary terms having large weight coefficients are less likely to be registered in the index.

In the first exemplary embodiment, the number of unnecessary terms is obtained for each block as shown in FIG. 5. However, in the present exemplary embodiment, the unnecessary term degree is obtained for each block as shown in FIG. 9.

FIG. 10 shows a table that is referred to when determining a region to be deleted from content. According to a setting example shown in FIG. 10, 30 is set as a first threshold value, and 50 is set as a second threshold value. The unnecessary term degree is a larger value as compared with the number of unnecessary terms to be compared with the threshold value in the first exemplary embodiment. Therefore, both the first threshold value and the second threshold value as shown in FIG. 10 are larger as compared with those in the first exemplary embodiment. Further, in the first exemplary embodiment, the number of unnecessary terms is compared with each threshold value to determine a region to be deleted from each block. On the other hand, in the present exemplary embodiment, the unnecessary term degree is compared with each threshold value to determine a region to be deleted from each block. Since the process itself is the same as that of the first exemplary embodiment, a description thereof will be omitted.

According to the present exemplary embodiment, a weight coefficient can be set for a term selected as an unnecessary term. Accordingly, when a very large weight coefficient is set for an unnecessary term that the user desires not to include in an index, a part of the acquired content including the unnecessary term is more likely to be selected as a deletion region to be deleted from the acquired content even if the appearance frequency of the unnecessary term in the part of the acquired content is small.

In addition, the above process prevents the term that does not represent the feature of the content from being included in the index, so that so-called search noise can be reduced and functions of an index can be improved. That is, search accuracy can be improved.

Furthermore, since the number of terms included in the index can be reduced, it is possible to reduce the capacity of the index. In recent years, the index may be stored in cloud. When a charge is made according to the amount of stored data, the charge amount can be reduced according to the present exemplary embodiment.

In the present exemplary embodiment, the term extraction unit 12 and the unnecessary term selection processing unit 13 are provided as an example of a generator. Terms are extracted from content to generate unnecessary term information. However, the unnecessary term information may be prepared in advance. In this case, plural types of unnecessary term information may be prepared. For example, unnecessary term information are prepared for document types. The deletion region determination unit 15 may perform a process to select unnecessary term information according to a type of the input content.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
   a processor configured to:
   acquire content for which index data is to be created;
   divide the content into predetermined blocks;
   store unnecessary term information specifying an unnecessary term among terms included in the content, wherein the unnecessary term is a term that is not to be registered in the index data; and
   based on the unnecessary term information, determine a region in each block of the content that is not referred to when the index data of the content is created, wherein:
   the determined region is separate and distinct from the unnecessary term, and
   the determining of the region in a respective block includes:
   counting a number of appearances of the unnecessary term in the respective block,
   determining whether the counted number is greater than or equal to a preset threshold,
   when the counted number is greater than or equal to the preset threshold, determining the region to be an entirety of the respective block, and
   when the counted number is less than the preset threshold, determining the region to be a part of the respective block.

2. The information processing device according to claim 1, wherein the processor is configured to
   generate the unnecessary term information in which a term selected by a user from the terms included in the content is set as the unnecessary term.

3. The information processing device according to claim 2, wherein the processor is configured to
   present to the user a term having an appearance frequency equal to or more than a predetermined threshold value among the terms included in the content as a candidate for the unnecessary term.

4. The information processing device according to claim 2, wherein the processor is configured to
   prompt the user to specify the unnecessary term and a weight coefficient of the unnecessary term, and
   determine the region in each respective block in accordance with a value calculated by multiplying the number of appearances of the unnecessary term in the respective block by the weight coefficient.

5. The information processing device according to claim 1, wherein
   the determining of the region in the respective block further includes:
   determining whether the counted number of appearances of the unnecessary term in the respective block is less than another threshold smaller than the preset threshold, and
   when the counted number is less than the another threshold, the region is not specified in the respective block such that the entirety of the respective block is referred to in creating the index data.

6. A non-transitory computer readable medium storing a program that causes a computer to execute information processing, the information processing comprising:
   acquiring content for which index data is to be created;
   dividing the content into predetermined blocks;
   storing unnecessary term information specifying an unnecessary term among terms included in the content, wherein the unnecessary term is a term that is not to be registered in the index data; and
   based on the unnecessary term information, determining a region in each block of the content that is not referred to when the index data of the content is created, wherein:
   the determined region is separate and distinct from the unnecessary term, and
   the determining of the region in a respective block includes:
   counting a number of appearances of the unnecessary term in the respective block,
   determining whether the counted number is greater than or equal to a preset threshold,
   when the counted number is greater than or equal to the preset threshold, determining the region to be an entirety of the respective block, and
   when the counted number is less than the preset threshold, determining the region to be a part of the respective block.

7. The non-transitory computer readable medium according to claim 6, wherein
   the determining of the region in the respective block further includes:
   determining whether the counted number of appearances of the unnecessary term in the respective block is less than another threshold smaller than the preset threshold, and
   when the counted number is less than the another threshold, the region is not specified in the respective block such that the entirety of the respective block is referred to in creating the index data.

8. An information processing device comprising:
   acquisition means for acquiring content for which index data is to be created;
   division means for dividing the content into predetermined blocks;
   storing means unnecessary term information specifying an unnecessary term among terms included in the content, wherein the unnecessary term is a term that is not to be registered in the index data; and
   determination means for, based on the unnecessary term information, determining a region in each block of the content that is not referred to when the index data of the content is created, wherein:
   the determined region is separate and distinct from the unnecessary term, and
   the determining of the region in a respective block includes:
   counting a number of appearances of the unnecessary term in the respective block,
   determining whether the counted number is greater than or equal to a preset threshold,
   when the counted number is greater than or equal to the preset threshold, determining the region to be an entirety of the respective block, and when the counted number is less than the preset threshold, determining the region to be a part of the respective block.

9. The information processing device according to claim 8, wherein
the determining of the region in the respective block further includes:
determining whether the counted number of appearances of the unnecessary term in the respective block is less than another threshold smaller than the preset threshold, and
when the counted number is less than the another threshold, the region is not specified in the respective block such that the entirety of the respective block is referred to in creating the index data.

* * * * *